United States Patent
Balasubramanian et al.

(10) Patent No.: US 9,823,298 B2
(45) Date of Patent: Nov. 21, 2017

(54) CRITICAL PATH ARCHITECT

(71) Applicant: ARM Limited, Cambridge (GB)

(72) Inventors: Satheesh Balasubramanian, Bangalore (IN); Shardendu Shekhar, Austin, TX (US); James Dennis Dodrill, Austin, TX (US); Sainarayanan Karatholuvu Suryanarayanan, Bangalore (IN)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/824,093

(22) Filed: Aug. 12, 2015

(65) Prior Publication Data
US 2017/0045576 A1    Feb. 16, 2017

(51) Int. Cl.
*G06F 17/50* (2006.01)
*G01R 31/28* (2006.01)

(52) U.S. Cl.
CPC ..... *G01R 31/2882* (2013.01); *G06F 17/5072* (2013.01); *G06F 17/5081* (2013.01); *G06F 17/505* (2013.01); *G06F 17/5031* (2013.01); *G06F 2217/82* (2013.01); *G06F 2217/84* (2013.01)

(58) Field of Classification Search
CPC ............. G06F 17/5081; G06F 17/5031; G06F 17/505; G06F 2217/82; G06F 2217/84
USPC ........ 716/115, 114, 113, 112, 108, 122, 136; 703/16
See application file for complete search history.

(56) References Cited

U.S. PATENT DOCUMENTS

| | | | |
|---|---|---|---|
| 5,974,247 A * | 10/1999 | Yonezawa | G06F 11/261 703/19 |
| 6,047,247 A * | 4/2000 | Iwanishi | G06F 11/008 324/762.02 |
| 6,216,256 B1 * | 4/2001 | Inoue | G06F 17/5031 326/101 |
| 6,415,426 B1 * | 7/2002 | Chang | G06F 17/5072 716/113 |
| 6,546,541 B1 * | 4/2003 | Petranovic | G06F 17/505 716/104 |
| 6,772,403 B1 * | 8/2004 | Sasaki | G06F 17/5022 716/113 |
| 8,302,046 B1 * | 10/2012 | Keller | G06F 17/5031 716/108 |
| 8,516,420 B1 * | 8/2013 | Kariat | G06F 17/5036 703/14 |
| 8,543,954 B1 * | 9/2013 | Keller | G06F 17/5031 703/14 |

(Continued)

FOREIGN PATENT DOCUMENTS

JP    2000150659 A * 5/2000
JP    2009075822 A * 4/2009

*Primary Examiner* — Phallaka Kik
(74) *Attorney, Agent, or Firm* — Pramudji Law Group PLLC; Ari Pramudji

(57) ABSTRACT

Various implementations described herein are directed to a system and methods for implementing a critical path architect. In one implementation, the critical path architect may be implemented with a system having a processor and memory including instructions stored thereon that, when executed by the processor, cause the processor to analyze timing data of an integrated circuit. The timing data may include transition times for cells along paths of the integrated circuit. The instructions may cause the processor to identify instances of timing degradation for the cells along the paths of the integrated circuit. The instructions may cause the processor to recommend changes for the instances of the cells along the paths having timing degradation.

19 Claims, 8 Drawing Sheets

(56) References Cited

U.S. PATENT DOCUMENTS

| | | | | |
|---|---|---|---|---|
| 8,595,669 | B1* | 11/2013 | Keller | G06F 17/5036 |
| | | | | 716/106 |
| 2003/0223522 | A1* | 12/2003 | Fukushima | H04L 7/0338 |
| | | | | 375/354 |
| 2004/0075436 | A1* | 4/2004 | Kurokawa | G06F 17/5036 |
| | | | | 324/318 |
| 2004/0098684 | A1* | 5/2004 | Amekawa | G06F 17/5045 |
| | | | | 716/115 |
| 2005/0135164 | A1* | 6/2005 | Kim | G11C 7/1078 |
| | | | | 365/194 |
| 2005/0232066 | A1* | 10/2005 | Ishibashi | G06F 17/5036 |
| | | | | 365/189.03 |
| 2007/0164785 | A1* | 7/2007 | He | G06F 17/5054 |
| | | | | 326/41 |
| 2007/0300193 | A1* | 12/2007 | Lillis | G06F 17/5072 |
| | | | | 716/113 |
| 2008/0256380 | A1* | 10/2008 | Tsutsumi | G06F 1/10 |
| | | | | 713/500 |
| 2008/0320427 | A1* | 12/2008 | Nakashima | G06F 17/5036 |
| | | | | 716/113 |
| 2011/0283248 | A1* | 11/2011 | Irie | G06F 17/5068 |
| | | | | 716/120 |
| 2012/0221995 | A1* | 8/2012 | Zahn | G06F 17/505 |
| | | | | 716/134 |
| 2013/0042119 | A1* | 2/2013 | Bennett | G06F 13/1684 |
| | | | | 713/300 |
| 2014/0288912 | A1* | 9/2014 | Inoue | G06F 17/5036 |
| | | | | 703/14 |
| 2015/0046721 | A1* | 2/2015 | Drake | G06F 1/08 |
| | | | | 713/300 |
| 2015/0256153 | A1* | 9/2015 | Lim | G11C 7/04 |
| | | | | 327/109 |

* cited by examiner

CRITICAL PATH ARCHITECT

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Generally, electronic designers employ various techniques to design integrated circuits, such as physical chips and/or physical layers. In some situations, during design processes, the designers may identify considerable power, performance, and area (PPA) gaps to close. Sometimes, the designers may resort to brute force manual techniques of sizing cells or ECO Routings (Engineering Change Order Routing) for closing these PPA gaps. These conventional techniques may be inefficient and cumbersome due to being approached manually. Further, in some cases, these conventional techniques may not be based on analytic data and so may be ineffective and insufficient.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to and are directed to a critical path architect (CPA) that may be used to improve power, performance, and area (PPA) of digital designs including physical design flow using electronic design automation (EDA) tools. In some instances, digital designs may have a PPA target, such as, e.g., meeting a timing requirement, which may be in a Giga-Hertz (GHz) range. Designers may extract physical parameters and timing parameters by using one or more or all of the following knobs to assist with achieving PPA knobs: (1) process knobs refer to voltage threshold (Vt) variants and channel length variants, (2) intellectual property (IP) knobs refer to a high performance library and a power management kit, (3) physical design knobs refer to efficient floorplan, placement, routing, etc., (4) EDA tool knobs refer to using practices recommended by EDA tool vendors, and (5) state of the art industry practices refer to advanced on-chip variation (AOCV) and statistical hold margin.

Various techniques described herein may be used and applied in digital designs to improve PPA. Some of these techniques may include one or more of the following: (A) one technique may refer to upsizing cells on critical path, (B) another technique may refer to applying a non-default rule or route (NDR) on critical routing nets after classifying them as resistance critical nets and/or capacitance critical nets, (C) another technique may refer to unbanking or debanking multi-bit flip-flops (MBFF) present on critical paths so that they may be replaced or resized with other flip-flops (e.g., single bit flops), and (D) still another technique may refer to grouping critical paths together and assigning them higher weights so that the tool may optimize them based on levels of priority.

In some implementations, critical path architect (CPA) flow may be configured to automate one or more or all of these techniques so that a user may be able to employ one or more or all of these techniques with less manual intervention. Further, in some cases, the CPA flow may be used with conventional EDA tools. These techniques are described in greater detail herein below.

Various implementations of a system and methods for analyzing timing data of an integrated circuit to identify instances of timing degradation and recommend changes will now be described in more detail herein with reference to FIGS. 1-8.

Figure 1:
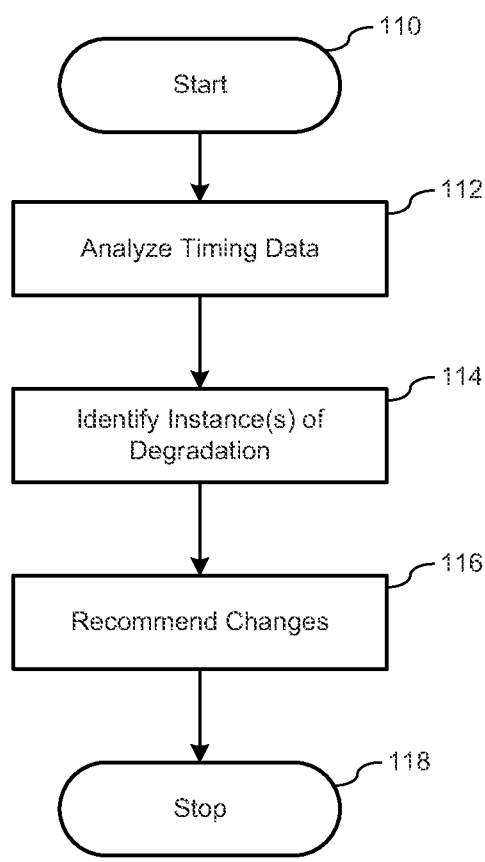
FIGS. 1-6 illustrate block diagrams of various methods for analyzing timing data of an integrated circuit to identify instances of timing degradation and recommend changes in accordance with various implementations described herein.

FIG. 1 illustrates a block diagram of a method 100 for analyzing timing data of an integrated circuit to identify instances of timing degradation and recommend changes in accordance with various implementations described herein. It should be understood that while method 100 indicates a particular order of execution of operations, in some instances, certain portions of the operations may be executed in a different order, and on different systems. In other instances, additional operations or steps may be added to method 100. Similarly, some operations or steps may be omitted. Further, computing device 800 of FIG. 8 may be configured to perform method 100.

In some implementations, method 100 may be implemented as a program or software instruction process configured for analyzing timing data of an integrated circuit to identify instances of timing degradation and recommend changes to improve power, performance, and area (PPA).

At block 110, method 100 starts, and at block 112, method 100 may analyze timing data of an integrated circuit. The timing data may include transition times for cells along paths of the integrated circuit. Further, cells may include standard cells, and paths may include a series of standard cells along various paths of the integrated circuit. Standard cells may includes memory cells, logic cells, etc.

At block 114, method 100 may identify instances of timing degradation for cells along paths of the integrated circuit. In some implementations, identifying instances of timing degradation may include identifying instances of cells along paths of the integrated circuit in which an output transition time is higher than an input transition time. In other implementations, identifying instances of timing degradation may include identifying instances of route length along the paths of the integrated circuit that may cause timing degradation. In yet other implementations, identifying instances of timing degradation may include identifying instances of cells along paths of the integrated circuit in which the cells include multi-bit flip-flops. In still other implementations, identifying instances of timing degradation may include identifying one or more paths of the integrated circuit in which to assign a weighted priority for performance enhancement.

At block 116, method 100 may recommend changes for instances of cells along paths having timing degradation, and then at block 118, method 100 may stop, end, or terminate. In some implementations, recommending changes for the instances of cells along paths having timing degradation may include recommending upsizing the instances of the cells along the paths having timing degradation to increase the output transition time to be equal to or at least less than the input transition time. Upsizing may include adding transistors to a cell to increase an area so as to decrease the slew rate or transition time of the cell. In other implementations, recommending changes for instances of cells along paths having timing degradation may include recommending modifying a threshold voltage of the instances of the cells along the paths having timing degradation to decrease the output transition time to be equal to or at least less than the input transition time.

In still other implementations, recommending changes for instances of cells along paths having timing degradation may include increasing the width of one or more wire traces along paths of the integrated circuit that cause timing degradation. In yet other implementations, recommending changes for instances of cells along paths having timing degradation may include recommending increasing spacing between wire traces along the paths of the integrated circuit that cause timing degradation.

In some other implementations, recommending changes for instances of cells along paths having timing degradation may include recommending debanking or unbanking the multi-bit flip-flops into individual flip-flops. In some other implementations, recommending changes for instances of cells along paths having timing degradation may include recommending changes for the paths based on the assigned weighted priority.

A. Upsizing Cells on Critical Paths:

Generally, a path on a digital design may refer to a series of cells or standard cells or other IP. In some cases, a well-constructed path may observe a reduction in slews (transition times) at one or more or all instances in the path when moving through the path from a first instance in the path to a last instance in the path. In various instances, slew time refers to transitions times, such as, e.g., rise time (low to high time transition) and fall time (high to low time transition). However, given that EDA tools may handle many such paths, there may be some inconsistencies when constructing these paths. This may lead to negative slack on the path, meaning that the path may not meet its timing target. However, it may be possible to optimize these paths with selective modification of one or more components in these paths.

For instance, techniques described herein provide an algorithm that scans a timing report of a design and identifies one or more or all instances of a path in which an output slew of the instance is higher than an input slew of the instance. These instances may be potentially upsized so that the output slew of the instance may become equal or lesser than the input instance. The delay of a cell may potentially improve along with the slew, and this may reduce a timing slack. For instance, the timing slack may be partially reduced, reduced to zero, or, sometimes, show a positive gain. This algorithm may be run repeatedly to see minor improvements with each run until the timing is fully closed. In some cases, the algorithm may be controlled to work only on paths on which a timing improvement is desired. In other cases, the algorithm may not carry out improvement on paths that have already met timing targets.

In some implementations, upsizing a cell may refer to increasing a cell size of the cell to a larger area. For instance, a cell having an area of, e.g., 10 µm may be upsized to a cell having an area of, e.g., 20 µm. This upsizing may decrease the output slew rate or output transition time of the cell. In some cases, the upsizing of a cell may be applied when the output slew of the cell is more than the input slew of the cell. There may be an upper boundary for upsizing a cell (e.g., a maximum upsize for a cell). In this case, if an upsize is not achievable, then a voltage (Vt) swap may be implemented. For instance, in the same area, a Vt swap refers to modifying a transistor to change the threshold voltage, which in turn may increase the slew rate. In various other cases, both upsizing and Vt swap may be used to modify the slew rate.

It is possible that upsizing a cell may cause an additional load on a previous cell, thereby causing a delay to slightly increase. For instance, the algorithm may be configured to consider a driving capability of a previous cell and may ensure that upsizing of a next cell (e.g., a following cell) in the path is within electrical boundaries of the driving cell.

Further, an end user may have flexibility to configure inputs to the tool so that the tool may know the boundaries under which the tool may perform the optimization. It may be therefore possible to provide different buckets for optimization so that the extent to which cells are upsized depend on these buckets.

In some situations, this technique may be achieved manually but may be prone to one or more of the following disadvantages. For instance, it may be difficult to repeatedly carry out this step, given the numerous instances in a digital design. Further, a manual step may mean that an end user may not be aware if the upsizing actually results in an improvement.

In accordance with techniques described herein, the algorithm may provide one or more of the following advantages. For instance, given that a process may be automated, this step may be repeated any number of times seamlessly. The script may work with conventional EDA tools. So, a user may not need to spend additional effort to run script outside EDA flows. Further, in some instances, it may be possible to determine an idea of impact to the PPA due to change that is being made to the instances before actually committing the change. If the change is not yielding positive results, the change may be undone.

Figure 2:
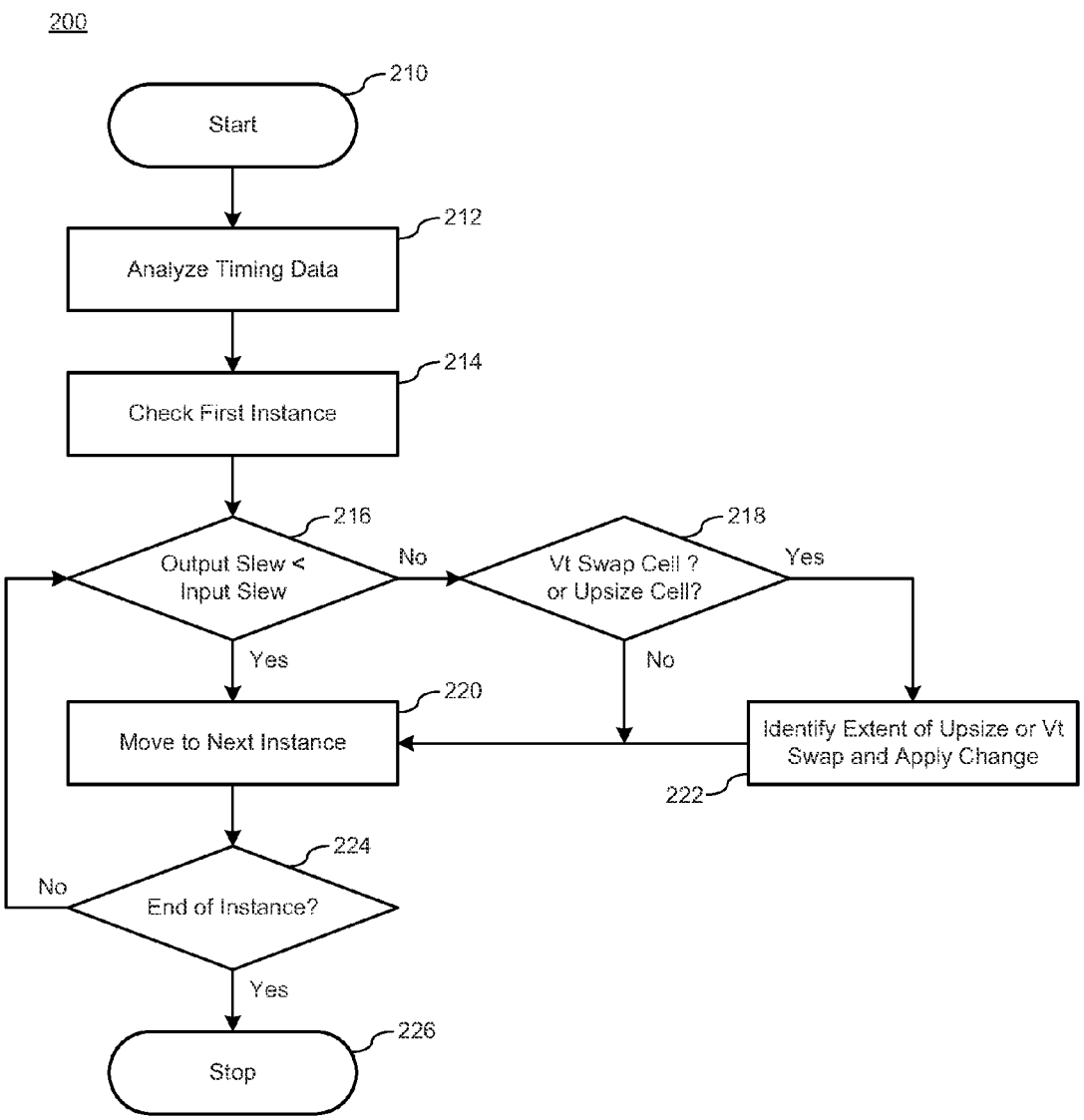

FIG. 2 illustrates a block diagram of a method 200 for analyzing timing data of an integrated circuit to identify instances of timing degradation and further recommend changes, including upsizing cells on critical paths using the CPA, in accordance with various implementations described herein. It should be understood that while method 200 indicates a particular order of execution of operations, in some instances, certain portions of the operations may be executed in a different order, and on different systems. In other instances, additional operations or steps may be added to method 200. Similarly, some operations or steps may be omitted. Further, in some implementations, computing device 800 of FIG. 8 may be configured to perform method 200.

Method 200 may be implemented as a program or software instruction process configured for analyzing timing data of an integrated circuit to identify instances of timing degradation and recommend changes to improve power, performance, and area (PPA). Further, the program or software instruction process may be configured for implementing the critical path architect (CPA).

At block 210, method 200 may start, and at block 212, method 200 may analyze timing data. At block 214, method 200 may check a first instance, e.g., of a cell. At block 216, method 200 may determine whether an output slew of the cell is less than an input slew of the cell. If not, then at block 218, method 200 may determine whether the voltage threshold (Vt) of the cell may be Vt swapped or upsized. If not, then at block 220, method 200 may move to a next instance. Otherwise, if yes, then at block 222, method 200 may identify an extent of the Vt swap or upsize, and then apply the change (or carry out the change). Processing may then then continue to block 220, where method 200 may move to the next instance.

Referring back to block 216, if the output slew of the cell is less than an input slew of the cell, then processing moves to block 220, where method 200 may move to the next instance. At block 224, method 200 may determine whether processing is at an end of the instance. If not, then method 200 may return to block 216. Otherwise, if yes, then method 200 may stop, end, or terminate at block 226.

B. Apply NDR on Critical Nets:

Another technique that may be applied to improve a timing path may refer to identifying capacitance critical nets and resistance critical nets and increasing width and/or spacing of a route. Similar to checking input and outputs of instances, the input and output slews of the nets may be compared. The input and output slew of the nets may be the same or see a small degradation. If the degradation is large, it means there is potential to optimize that route. For instance, the length of the route may be checked against a threshold value given by a user to ensure it meets a predetermined length, such as, e.g., a minimum length requirement. Further, an incremental delay component of the net may be checked. For instance, if the incremental delay is significant when compared to a threshold value defined by a user, it may indicate that the net is a capacitance dominated net. In this case, the net may be rerouted by having the same width for the metal and increasing the spacing of the wire to adjacent routes. If the net is not capacitance dominated, then the net may be resistance dominated. In this case, the width and spacing of the net may be increased to reduce an impact of resistance. In some cases, increasing the width of the wire may reduce the resistance. In other cases, if the length of the routing wire is maintained and held constant, then increasing the width of the wire may thus increase resistance, and increasing the spacing between wires (e.g., distance between adjacent wires for different cells) may reduce the capacitance.

In accordance with techniques described herein, the algorithm may provide one or more of the following advantages. For instance, it may be possible to determine if a net is resistance critical or capacitance critical and decide the NDR for the net. In some case, default (as used in NDR) may refer to a predetermined spacing, such as, e.g., a minimum spacing between routing wires or traces. Further, in some instances, it may be possible to do an impact analysis of the NDR assignment and carry out a change if or only if the change provides a positive result. Another technique to identify critical nets may include scanning a timing report and looking for a net that is succeeded by a chain of inverters or buffers. If the total number of inverters or buffers succeeding a net cross a critical value, then the net may be considered for applying NDR.

Figure 3:
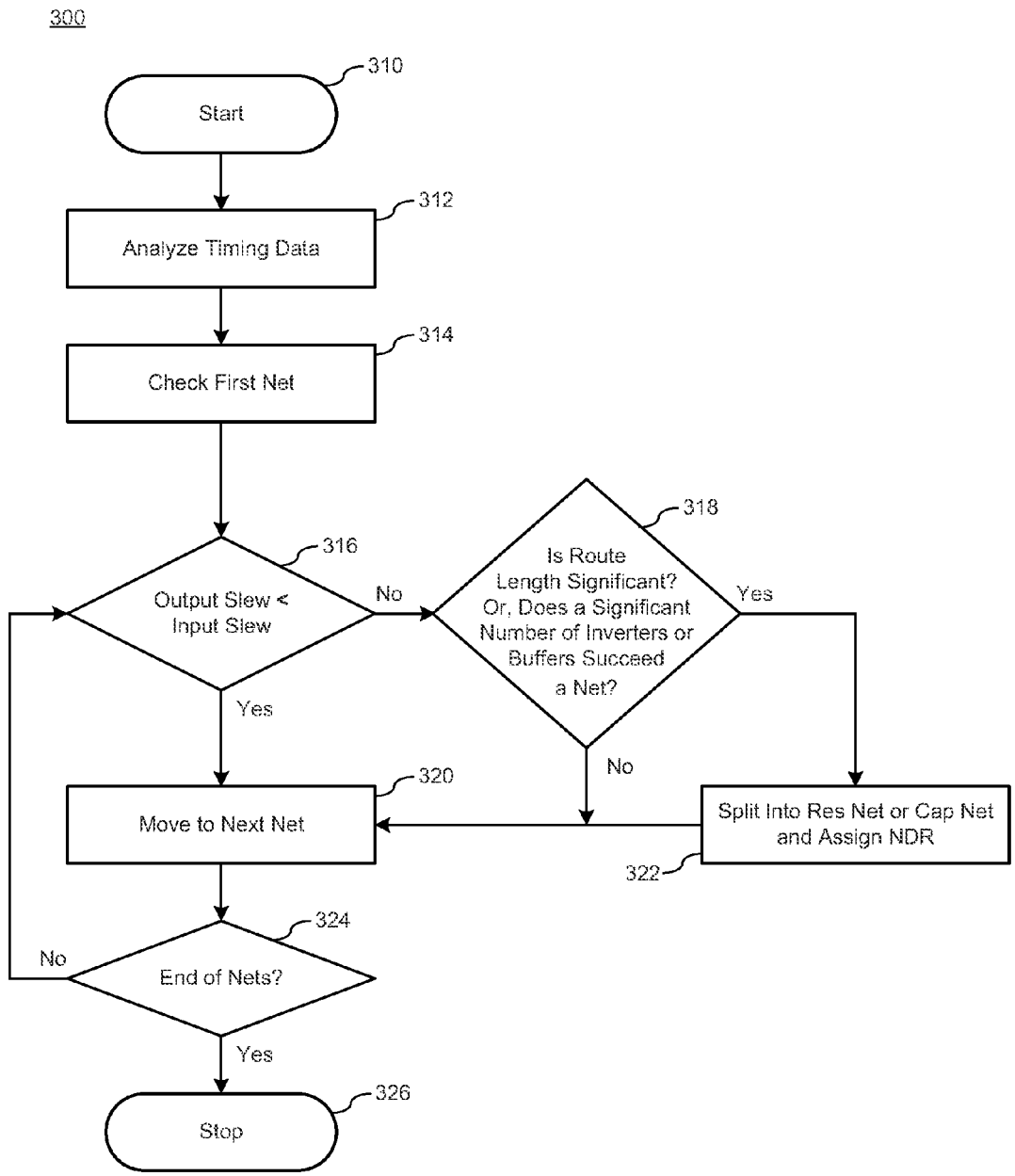

FIG. 3 illustrates a block diagram of a method 300 for analyzing timing data of an integrated circuit to identify instances of timing degradation and further recommend changes, including assigning a non-default rule (NDR) on critical paths using the CPA, in accordance with various implementations described herein. It should be understood that while method 300 indicates a particular order of execution of operations, in some instances, certain portions of the operations may be executed in a different order, and on different systems. In other instances, additional operations or steps may be added to method 300. Similarly, some operations or steps may be omitted. Further, computing device 800 of FIG. 8 may be configured to perform method 300.

In some implementations, method 300 may be implemented as a program or software instruction process configured for analyzing timing data of an integrated circuit to identify instances of timing degradation and recommend changes to improve power, performance, and area (PPA). Further, the program or software instruction process may be configured for implementing the critical path architect (CPA).

At block 310, method 300 may start, and at block 312, method 300 may analyze timing data. At block 314, method 300 may check a first net. At block 316, method 300 may determine whether an output slew of the net is less than an input slew of the net. If not, then at block 318, method 300 may determine whether a route length is significant enough, or does a significant number of inverters (or buffers) succeed a net. If not, then at block 320, method 300 may move to a next net. Otherwise, if yes, then at block 322, method 300 may split the net into a resistive net or a capacitive net and assign an NDR. Method 300 may then move to the next net at block 320.

Referring back to block 316, if the output slew of the net is less than an input slew of the net, then at block 320, method 300 may move to the next net. At block 324, method 300 may determine whether processing is at an end of the nets. If not, then method 300 may return to block 316. Otherwise, if yes, then method 300 may stop, end, or terminate at block 326.

C. Debank Multi-bit Flip-Flops on Critical Paths:

Multi-bit flops (MBFFs) are supported in a library so as to reduce power in digital designs. For instance, an example of a multi-bit flip flop is a 4-bit flip-flop. Further, multi-bit flops or cells may be supported as low power versions and may not be present as high performance cells. Multi-bit flip-flops may be instantiated in digital designs early in the flow (during synthesis) to ensure optimum usage. However, using multi-bit cells on top critical paths may lead to PPA loss because the multi-bit cells may not be replaced with higher performance cells. This technique may be applied to critical paths, and this technique may be configured to check for timing slack on an entire path, which may refer to positive (+) timing slack or negative (−) timing slack. In some cases, the timing slack may refer to a sum of slews for the entire path.

One algorithm in accordance with techniques described herein may identify multi-bit cells on critical paths in timing reports and split them into individual bits so that these individual bits may be optimized to improve timing. The user may have flexibility to run this step during synthesis or during placement and routing.

Figure 4:
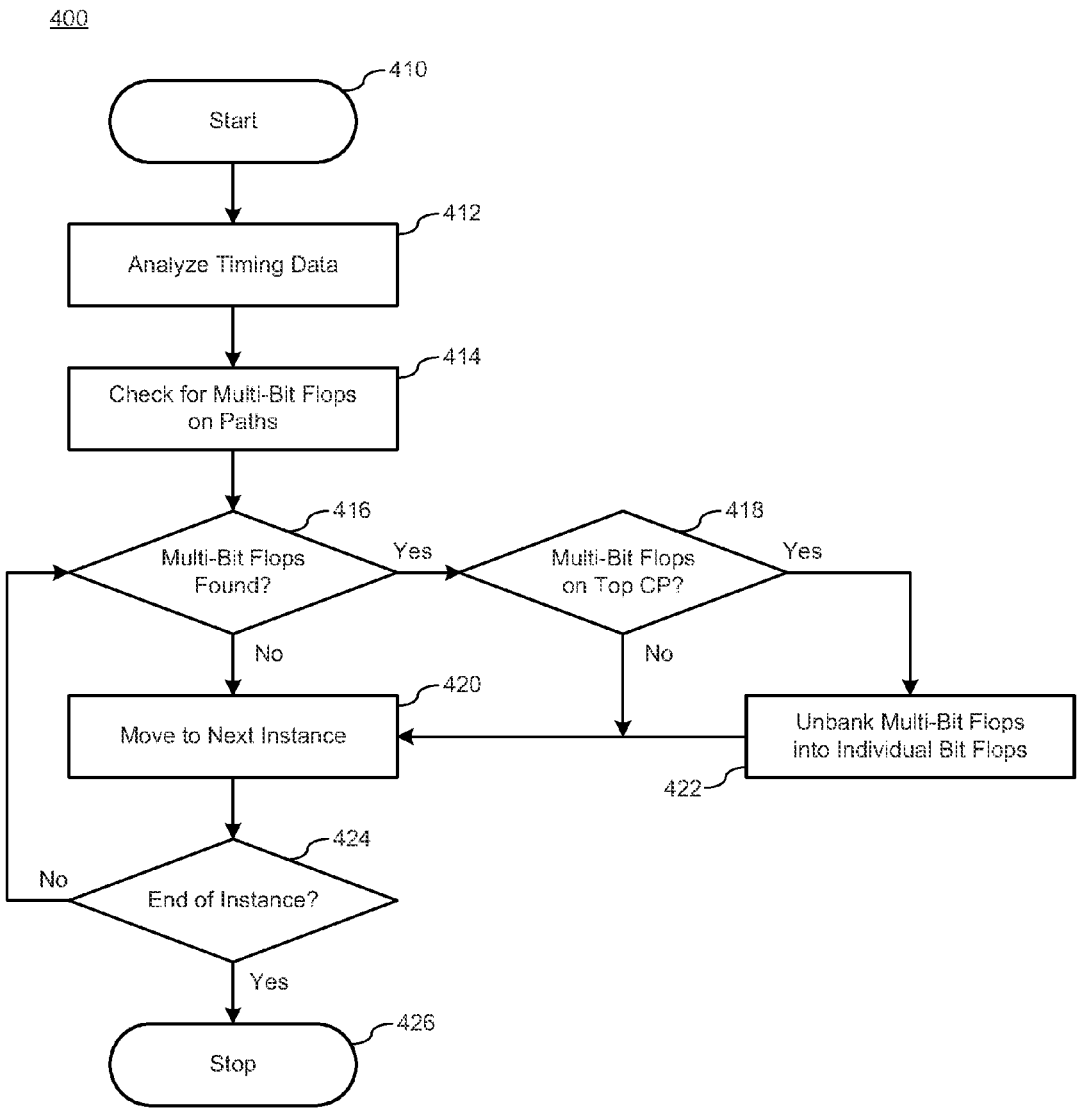

FIG. 4 illustrates a block diagram of a method 400 for analyzing timing data of an integrated circuit to identify instances of timing degradation and further recommend changes, including unbanking or debanking multi-bit flip-flops (MBFFs) using the CPA, in accordance with various implementations described herein. It should be understood that while method 400 indicates a particular order of execution of operations, in some instances, certain portions of the operations may be executed in a different order, and on different systems. In other instances, additional operations or steps may be added to method 400. Similarly, some operations or steps may be omitted. Further, computing device 800 of FIG. 8 may be configured to perform method 400.

In some implementations, method 400 may be implemented as a program or software instruction process configured for analyzing timing data of an integrated circuit to identify instances of timing degradation and recommend changes to improve power, performance, and area (PPA). Further, the program or software instruction process may be configured for implementing the critical path architect (CPA).

At block 410, method 400 may start, and at block 412, timing data may be analyzed. At block 414, method 400 may check multi-bit flops on one or more paths. At block 416, method 400 may determine whether multi-bit flops are found. If yes, then at block 418, method 400 may determine whether the multi-bit flops are on a top critical path (CP). If not, then at block 420, method 400 may move to a next instance. Otherwise, if yes, then at block 422, method 400 may unbank (or debank) the multi-bit flops into individual bit flops. Method 400 may then move to the next instance at block 420.

Referring back to block 416, if multi-bit flops are not found, then at block 420, method 400 may move to the next instance. At block 424, method 400 may determine whether processing is at an end of the instance. If not, then method 400 may return to block 416. Otherwise, if yes, then method 400 stop, end, or terminate at block 426.

D. Grouping of Critical Paths:

In some cases, EDA tools may have a capability to work on critical paths based on priority provided they are assigned higher weights. One algorithm described herein may be configured to review timing paths and assign a weight assignment statement (or a weighted priority statement) to the top N critical paths (N defined by user) so that these N paths may be given a higher priority during path optimization. Further, a user may have flexibility to use the group during synthesis and or placement.

Figure 5:
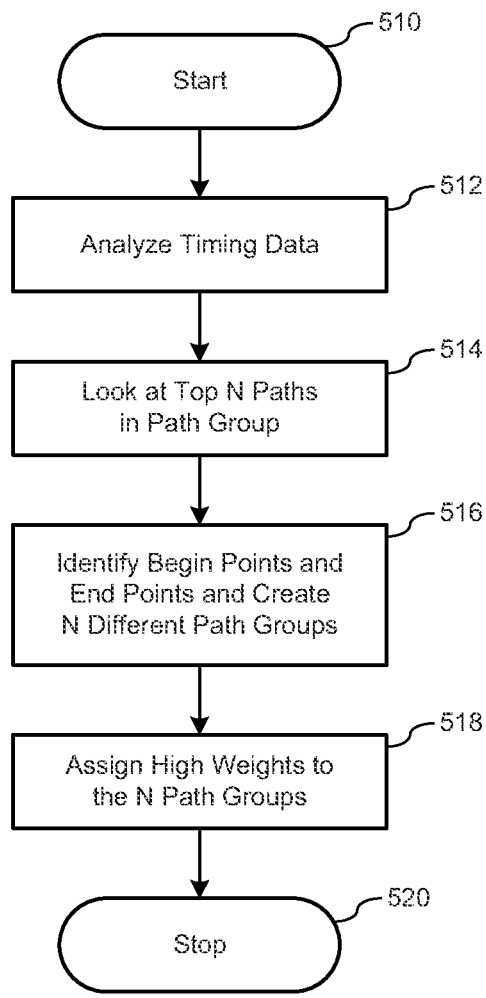

FIG. 5 illustrates a block diagram of a method 500 for analyzing timing data of an integrated circuit to identify instances of timing degradation and further recommend changes, including grouping critical paths based on priority, in accordance with various implementations described herein. It should be understood that while method 500 indicates a particular order of execution of operations, in some instances, certain portions of the operations may be executed in a different order, and on different systems. In other instances, additional operations or steps may be added to method 500. Similarly, some operations or steps may be omitted. Further, in some implementations, computing device 800 of FIG. 8 may be configured to perform method 500.

In some implementations, method 500 may be implemented as a program or software instruction process configured for analyzing timing data of an integrated circuit to identify instances of timing degradation and recommend changes to improve power, performance, and area (PPA). Further, the program or software instruction process may be configured for implementing the critical path architect (CPA).

At block 510, method 500 may start, and at block 512, method 500 may analyze timing data. At block 514, method 500 may look at top N paths in a path group. At block 516, method 500 may identify one or more begin points and/or end points and then create N different path groups. At block 518, method 500 may assign high weights (e.g., weight assignment statement or weighted priority statement) to the N path groups. Then, at block 520, method 500 may stop, end, or terminate.

Figure 6:
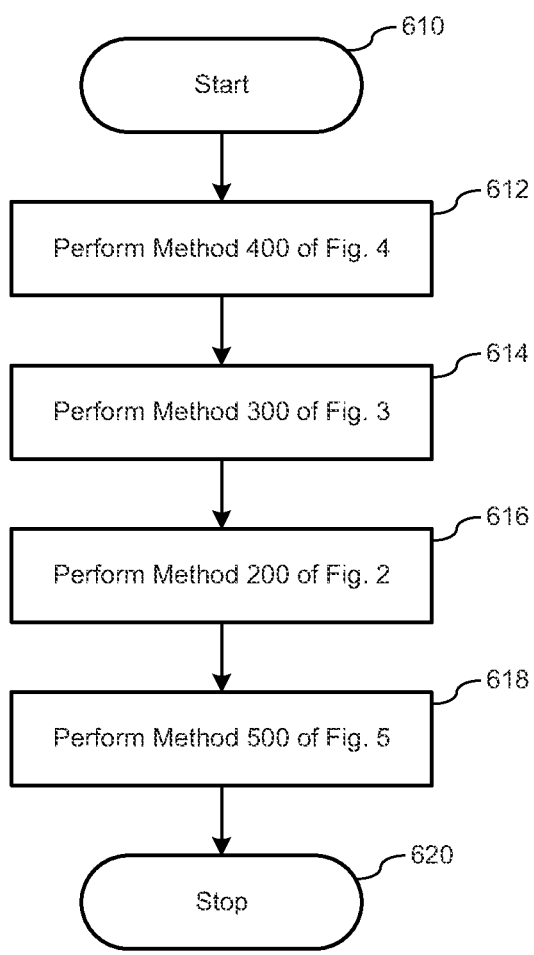

FIG. 6 illustrates a block diagram of a method 600 for analyzing timing data of an integrated circuit to identify instances of timing degradation and further recommend changes in accordance with various implementations described herein. It should be understood that while method 600 indicates a particular order of execution of operations, in some instances, certain portions of the operations may be executed in a different order, and on different systems. In other instances, additional operations or steps may be added to method 600. Similarly, some operations or steps may be omitted. Further, computing device 800 of FIG. 8 may be configured to perform method 600.

In some implementations, method 600 may be implemented as a program or software instruction process configured for analyzing timing data of an integrated circuit to identify instances of timing degradation and recommend changes to improve power, performance, and area (PPA). Further, the program or software instruction process may be configured for implementing the critical path architect (CPA).

At block 610, method 600 may start, and at block 612, method 600 may perform the method 400 of FIG. 4. At block 614, method 600 may perform the method 300 of FIG. 3. At block 616, method 600 may perform the method 200 of FIG. 2. At block 618, method 600 may perform the method 500 of FIG. 5. Then, at block 620, method 600 may stop, end, or terminate. As described herein, the operations of blocks 612, 614, 616, and 618 may be executed in a different order, and further, additional operations or steps may be added and/or some operations or steps may be omitted.

Figure 7:
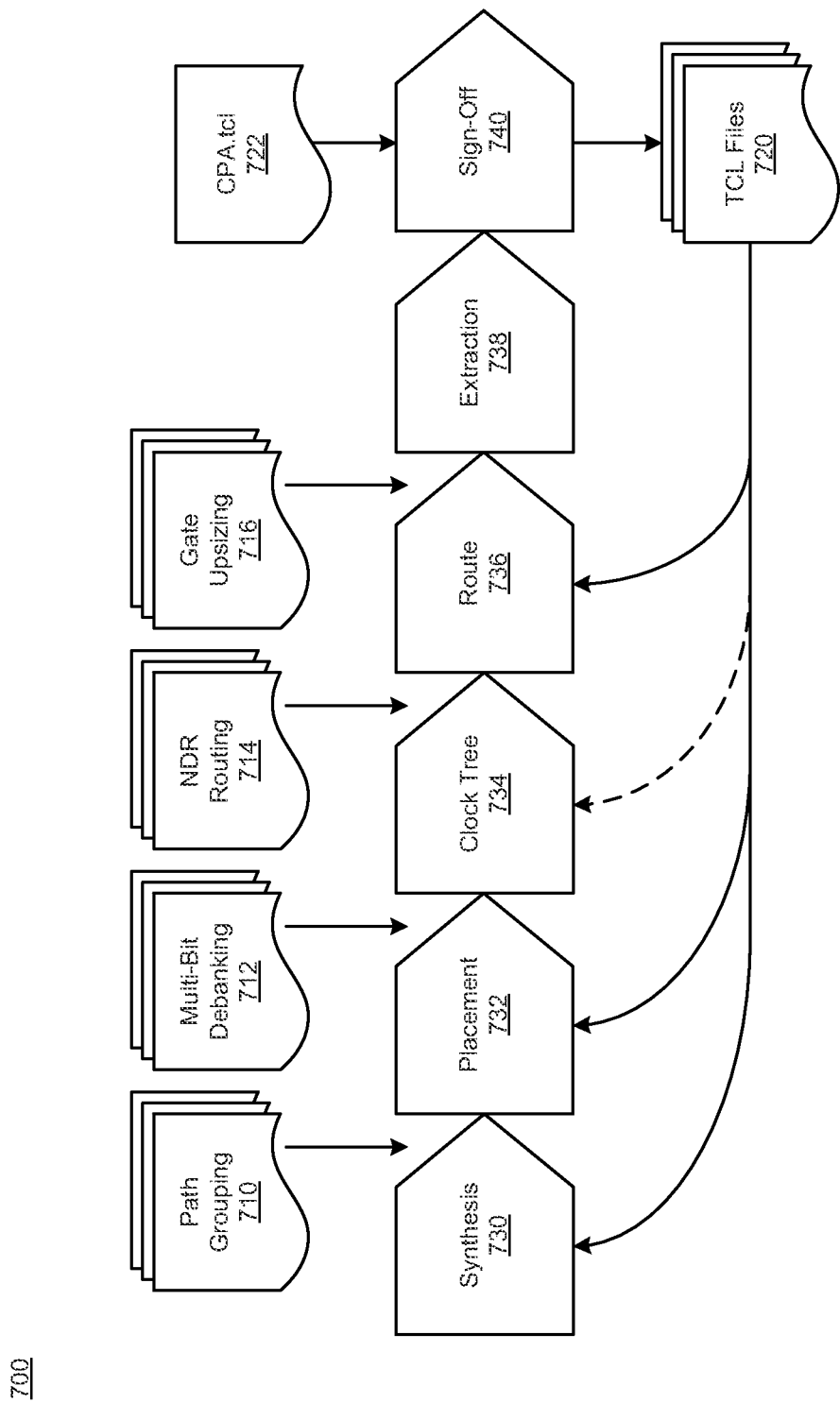
FIGS. 7 illustrates a block diagram of an overview for analyzing timing data of an integrated circuit to identify instances of timing degradation and recommend changes in accordance with various implementations described herein.

FIG. 7 illustrates a block diagram of an overview 700 for analyzing timing data of an integrated circuit to identify instances of timing degradation and further recommend changes in accordance with various implementations described herein. As described herein, the CPA tool may improve PPA. In some cases, the CPA tool may be configured to automate the various techniques (as described herein in reference to FIGS. 1-6) that may be used for PPA optimization. Further, in some cases, the commands provided by the CPA tool may be used seamlessly with conventional EDA tools, which may provide savings on time consuming manual iterations.

In various implementations, critical path architect (CPA) refers to an electronic design automation (EDA) tool that may be used to analyze critical paths of an integrated circuit and identify opportunities to improve timing across cell instances. One technique refers to using gate upsizing 716 and identifying cell candidates by monitoring slew rate degradation across cell instances. In some instances, a magnitude of degradation may determine an amount of upsizing for cells. Signal net NDR (Non-Default Rule) routing 714 and multi-bit flip-flop (MBFF) identification and debanking 712 on critical paths refers to other strategies that may be implemented. Further, path grouping 710 on critical paths refers to another strategy that may be implemented.

Referring to FIG. 7, the overview 700 may provide a process flow for various phase or stages when implementing the various techniques of the CPA. For instance, an output for a synthesis stage 730 may provide timing data for path grouping 710, an output for a placement stage 732 may provide timing data for multi-bit debanking 712, an output for a clock tree stage 734 may provide timing data for NDR routing 714, and an output for a route stage may provide timing data for gate upsizing 716. These stages 730, 732, 734, 736 may be followed by an extraction stage 738 and then a sign-off stage 740. In some instances, the CPA may write (e.g., create, generate, etc.) one or more output files that may specify or recommend optimizations for an integrated circuit based on sign-off timing via the sign-off stage

740, and these output files may be fed back to each phase or stage 730, 732, 734, 736 of the overview process flow 700 for a next iteration.

In some implementations, the CPA may be configured to utilize one or more algorithm files (TCL files) 720, such as, e.g., a main program file (i.e., arm_cpa.tcl) 722 and/or an options program file (i.e., cpa_tech.tcl) that may be used to configure the EDA tool. These and various other techniques including the main program file and the options program file are described herein below.

Gate Upsizing Options:

1. cell_slew_degrade_limit: [5 ps 15 ps 25 ps]

This option program file may be used to set criteria for upsizing cells on critical path, such as, e.g., 5 ps may refer to criteria for upsizing by 1, 10 ps may refer to criteria for upsizing by 2, and 25 ps may refer to criteria for upsizing by 3.

2. logical_effort_sizing 1

This option program file may be used to set this option to 1, which may refer to monitoring slew rate degradation on one or more cells preceding a cell selected for upsizing, and which may determine if there is enough margin to a boundary imposed by option 1; if not, it may lower an upsizing amount.

3. hold_buffer_regex

This option program file may be used to specify a regex that may be used to ignore cells for upsizing. For instance, one or more or all cells having an instance name matching the regex may not be considered for upsizing. In some instances, only one regex may be specified. In other instances, one or more regex may be specified.

4. net_slew_degrade_limit: [5 ps 10 ps 45 ps ]

This option program file may be used similarly as with 1 (above), but for nets, and may be used to determine which NDR is applicable by evaluating slew degradation.

5. critical_noise_ratio: [0.15 0.35 0.5]

This option program file may be used to identify noise_ratio, which may be defined in code as incr_delay/total_delay across net. For instance, if the noise ratio is higher than NDR with higher spacing, then this instance is given a priority over higher width NDR.

6. write_ndr: default set to 0

This option program file may be used to enable output of signal NDR script. This script may be imported in electronic design for industry (EDI).

7. NDR definitions

NDR definition lines start with NDR and may be grouped by a common width/spacing. The format is described herein below and may be similar to the add_ndr command in EDI.

NDR:[(<metal list>)(<width>,<spacing>)(<via_list>)]

8. debank_mbff

This option program file may be used to identify multi-bit flip-flops (MBFFs) in critical paths. In some instance, an output may include script, which may be used in synthesis to block inferring of multi-bit flip-flops (MBFFs) for those instances.

Usage: The tool may run inside a tempus environment and may have four command line parameters:

1. -max_slack
2. -max_paths
3. -path_group
4. -view

The tool may be configured for internally running report_timing command to obtain critical path and function of each command line parameter, which may be similar to using the report_timing command. If multiple views are loaded, then command line parameter -view may be set to analysis view, which may correspond to a worst setup corner. For instance, a sample usage is shown below:

tempus>source arm_cpa.tcl
tempus>arm_cpa -max_slack 0 -max_paths 300 -view func_ssgnp_cworstccworstt_max_0p72v_0c_cworst -path_group reg2reg
Outputs
Gate sizing : post_route_cell_size_eco.tcl This script should be applied to post route database. It performs ecoCellSize followed by an ecoRoute Signal net NDR:post_route_ndr_net.tcl
Applied to post route database in EDI
MBFF:synthesis_debank_Multi-bitflop.tcl
Applied at the synthesis stage 730.

The various techniques described herein enable and provide a means for users to improve PPA by adopting one or more of the following techniques. Appropriately sizing-up cells on a critical path may improve timing. Applying NDR on critical nets may improve timing. Hiding and/or unbanking multi-bit flip-flops on critical paths may improve timing. Further, grouping critical paths and assigning higher weights to them during synthesis and placement optimization may improve timing. Flip-flops may be simply referred to as flops, and unbanking multi-bit flip-flops may be referred to as debanking multi-bit flip-flops.

Figure 8:
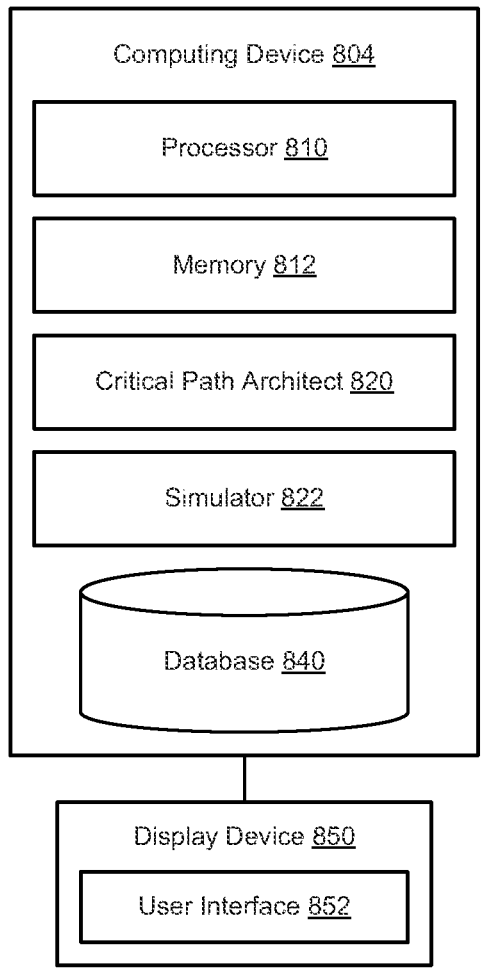
FIG. 8 illustrates a block diagram of a system for analyzing timing data of an integrated circuit to identify instances of timing degradation and recommend changes in accordance with various implementations described herein.

FIG. 8 illustrates a block diagram of a system 800 for analyzing timing data of an integrated circuit to identify instances of timing degradation and further recommend changes in accordance with various implementations described herein. Further, in some implementations, the system 800 may be configured for providing a critical path architect (CPA) in accordance with various implementations described herein.

In reference to FIG. 8, the system 800 may include a computer based system configured to analyze timing data of an integrated circuit to identify instances of timing degradation and further recommend changes. The system 800 may be associated with at least one computing device 804 that is implemented as a special purpose machine configured to analyze timing data of an integrated circuit to identify instances of timing degradation and recommend changes, as described herein. In some implementations, the computing device 404 may be implemented as a special purpose machine configured to provide the critical path architect (CPA), as described herein.

Further, the computing device 804 may include any standard element(s) and/or component(s), including at least one processor(s) 810, memory 812 (e.g., non-transitory computer-readable storage medium), one or more database(s) 840, power, peripherals, and various other computing elements and/or components that may not be specifically shown in FIG. 8. The computing device 804 may include instructions stored on the non-transitory computer-readable medium 812 that are executable by the at least one processor 810. The computing device 804 may be associated with a display device 850 (e.g., a monitor or other display) that may be used to provide a user interface (UI) 852, such as, e.g., a graphical user interface (GUI). In some instances, the UI 852 may be used to receive various parameters and/or preferences from a user for managing, operating, and/or utilizing the computing device 804. As such, the computing device 804 may include the display device 850 for providing output to a user, and the display device 850 may include the UI 852 for receiving input from the user.

In various implementations, the computing device 804 may be configured to implement a methodology for analyzing timing data of an integrated circuit to identify instances of timing degradation and recommend changes. For instance, the computing device 804 may analyze timing data of an integrated circuit, wherein the timing data includes transition times (slew rates) for cells along paths of the integrated circuit. The computing device 804 may be configured to identify instances of timing degradation for the cells along the paths of the integrated circuit. Further, the computing device 804 may be configured to recommend changes for the identified instances of the cells along the paths with or showing or identified as having timing degradation.

In various implementations, the computing device 804 may be configured to implement the various techniques for the critical path architect (CPA). For instance, the computing device 804 may be configured to implement one or more of the following objectives that may be applied in digital designs to improve power, performance, and area (PPA). The computing device 804 may be configured to upsize cells on critical path, apply NDR on critical routing nets after classifying them, e.g., as resistance critical nets and/or capacitance critical nets, debank Multi-bit Flops present on critical paths so that they may be replaced by other flops that may be resized, and group critical paths together and assign them higher weights so that the tool may optimize them with higher priority. As such, the computing device 804 may be configured to implement a CPA process flow that automates one or more or all of these objectives so that a user may employ one or more or all of these techniques with less manual intervention. Further, in some cases, the computing device 804 may be configured to provide a CPA process flow that may work seamlessly with conventional EDA tools.

In reference to FIG. 8, the computing device 804 may include a critical path architect module 820 configured to cause the at least one processor 810 to implement one or more or all techniques described in reference to FIGS. 1-7, including techniques related to method 100 of FIG. 1, upsizing cells as described in reference to method 200 of FIG. 2, assigning NDRs as described in reference to method 300 of FIG. 3, debanking multi-bit flops as described in reference to method 4000 FIG. 4, and assigning weighted priorities as described in reference to method 500 of FIG. 5. The critical path architect module 820 may be referred to as a CPA component and may be implemented in hardware or software. If implemented in software, the critical path architect module 820 may be stored in memory 812 or database 840. If implemented in hardware, the critical path architect module 820 may be a separate processing component configured to interface with the processor 810. The critical path architect module 820 may be configured to cause the at least one processor 810 to implement grouping of critical paths, as described herein. The critical path architect module 820 may be configured to cause the at least one processor 810 to implement a plurality of these methods 100, 200, 300, 400, 500 in a series of processing events as described in reference to method 600 of FIG. 6. Further, the critical path architect module 820 may be configured to cause the at least one processor 810 to implement various techniques and features of the overview process flow 700 as described in reference to FIG. 7.

Thus, in various implementations, as described herein in reference to FIGS. 1-7, the critical path architect module 820 may be configured to cause the at least one processor 810 to further process and analyze timing data of an integrated circuit to identify instances of timing degradation. For instance, the critical path architect module 820 may be configured to identify specific instances of timing degradation by identifying instances of cells along the paths of the integrated circuit in which an output transition time is higher than an input transition time. In these instances, the critical path architect module 820 may be configured to recommend changes for instances of the cells along the paths having timing degradation by recommending upsizing the instances of the cells along the paths having timing degradation to increase the output transition time to be equal to or less than the input transition time. Further, in these instances, the critical path architect module 820 may be configured to recommend changes for instances of the cells along the paths having timing degradation by recommending modifying a threshold voltage of the instances of the cells along the paths having timing degradation to increase the output transition time to be equal to or less than the input transition time.

In some implementations, the critical path architect module 820 may be configured to identify instances of timing degradation by identifying instances of route length along the paths of the integrated circuit that cause timing degradation. In this instance, the critical path architect module 820 may be configured to recommend changes for instances of cells along paths having timing degradation by recommending increasing a width of a wire trace along the paths of the integrated circuit that are identified as causing timing degradation. Further, in this instance, the critical path architect module 820 may be configured to recommend changes for the instances of the cells along the paths having timing degradation by recommending increasing spacing between wire traces along the paths of the integrated circuit that cause timing degradation.

In some implementations, the critical path architect module 820 may be configured to identify instances of timing degradation by identifying instances of cells along the paths of the integrated circuit in which the cells comprise multi-bit flip-flops. In this instance, the critical path architect module 820 may be configured to recommend changes for the instances of the cells along the paths having timing degradation by recommending debanking or unbanking the multi-bit flip-flops into individual flip-flops.

In some implementations, the critical path architect module 820 may be configured to identify instances of timing degradation by identifying one or more paths of the integrated circuit in which to assign a weighted priority for performance enhancement. In this instance, the critical path architect module 820 may be configured to recommend changes for the instances of the cells along the paths having timing degradation by recommending changes for the paths based on the assigned weighted priority.

In reference to FIG. 8, the computing device 804 may include a simulator module 822 configured to cause the at least one processor 810 to generate one or more simulations of the integrated circuit. The simulator module 822 may be referred to as a simulating component and may be implemented in hardware or software. If implemented in software, the simulator module 822 may be stored in memory 812 or database 840. If implemented in hardware, the simulator module 820 may be a separate processing component configured to interface with the processor 810. In some instances, the simulator module 822 may include a SPICE simulator configured to generate SPICE simulations of the integrated circuit. Generally, SPICE is an acronym for Simulation Program with Integrated Circuit Emphasis, which is an open source analog electronic circuit simulator. Further, SPICE is a general-purpose software program used by the semiconductor industry to check the integrity of integrated circuit designs and to predict the behavior of integrated circuit designs. Therefore, in some instances, the critical path architect module 820 may be configured to interface with the simulator module 822 to generate timing data based on one or more simulations (including, e.g., SPICE simulations) of an integrated circuit that may be used for analyzing the timing data of the integrated circuit to identify instances of timing degradation. Further, the critical path architect module 820 may be configured to use the one or more simulations (including, e.g., SPICE simulations) of an integrated circuit for recommending changes for instances of the cells along the paths having timing degradation, as described herein.

In some implementation, the computing device 804 may include one or more databases 840 configured to store and/or record various information related to analyzing timing data of the integrated circuit to identify instances of timing degradation and recommend changes. In various instances, the database(s) 840 may be configured to store and/or record information related to the integrated circuit and the timing data. Further, the database(s) 840 may be configured to store and/or record information related to the integrated circuit and timing data in reference to simulation data (including, e.g., SPICE simulation data).

Described herein are various implementations of a system having a processor and memory. The memory may include instructions stored thereon that, when executed by the processor, cause the processor to analyze timing data of an integrated circuit. The timing data may include transition times for cells along paths of the integrated circuit. The instructions may cause the processor to identify instances of timing degradation for the cells along the paths of the integrated circuit and recommend changes for the instances of the cells along the paths having timing degradation.

Described herein are various implementations of a non-transitory computer readable storage medium having stored thereon instructions that, when executed by a processor, cause the processor to analyze timing data of an integrated circuit. The timing data may include input and output transition times for cells along paths of the integrated circuit. The instructions may cause the processor to identify instances of the cells along the paths of the integrated circuit in which an output transition time is greater than an input transition time. The instructions may cause the processor to recommend changes for the instances of the cells along the paths having the output transition time greater than the input transition time.

Described herein are various implementations of a method. The method may analyze timing data of an integrated circuit. The timing data may include input and output transition times for cells along paths of the integrated circuit. The method may identify instances of the cells along the paths of the integrated circuit in which an output transition time is greater than an input transition time. The method may recommend changes for the instances of the cells along the paths having the output transition time greater than the input transition time. In various implementations, recommending changes may include one or more of upsizing the instances of the cells along the paths, modifying a threshold voltage of the instances of the cells along the paths, increasing a width of a wire trace along the paths of the integrated circuit that cause timing degradation, increasing spacing between wire traces along the paths of the integrated circuit that cause timing degradation, and debanking or unbanking multi-bit flip-flops into individual flip-flops.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context.

Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   a processor; and
   memory having stored thereon instructions that, when executed by the processor, cause the processor to:
   analyze timing data of an integrated circuit, wherein the timing data includes transition times for cells along paths of the integrated circuit;
   identify instances of timing degradation for the cells along the paths of the integrated circuit in which an output transition time is higher than an input transition time;
   recommend changes for the instances of the cells along the paths having timing degradation, wherein if a length of a path having timing degradation exceeds a first threshold value or a number of inverters or buffers succeeding the path having timing degradation exceeds a second threshold value, split the path into a resistance critical path or a capacitance critical path and assigning a non-default rule to the resistance critical path or the capacitance critical path;
   generate at least one file for fabricating an integrated circuit in accordance with the recommended changes; and
   fabricate, or cause to be fabricated, an integrated circuit in accordance with the at least one file.

2. The system of claim 1, wherein the cells comprise standard cells.

3. The system of claim 2, wherein the paths of the integrated circuit comprise a series of standard cells.

4. The system of claim 1, wherein the instructions to recommend changes for the instances of the cells along the paths having timing degradation comprise instructions to upsize the instances of the cells along the paths having timing degradation to decrease the output transition time to be equal to or less than the input transition time.

5. The system of claim 1, wherein the instructions to recommend changes for the instances of the cells along the paths having timing degradation comprise instructions to modify a threshold voltage of the instances of the cells along the paths having timing degradation to decrease the output transition time to be equal to or less than the input transition time.

6. The system of claim 1, wherein the instructions to identify instances of timing degradation comprise instructions to identify instances of route length along the paths of the integrated circuit that cause timing degradation.

7. The system of claim 6, wherein the instructions to recommend changes for the instances of the cells along the paths having timing degradation comprise instructions to increase a width of a wire trace along the paths of the integrated circuit that cause timing degradation.

8. The system of claim 6, wherein the instructions to recommend changes for the instances of the cells along the paths having timing degradation comprise instructions to increase spacing between wire traces along the paths of the integrated circuit that cause timing degradation.

9. The system of claim 1, wherein the instructions to identify instances of timing degradation comprise instructions to identify instances of cells along the paths of the integrated circuit in which the cells comprise multi-bit flip-flops.

10. The system of claim 9, wherein the instructions to recommend changes for the instances of the cells along the paths having timing degradation comprise instructions to debank or unbank the multi-bit flip-flops into individual flip-flops.

11. The system of claim 1, wherein the instructions to identify instances of timing degradation comprise instructions to identify one or more paths of the integrated circuit in which to assign a weighted priority for performance enhancement.

12. The system of claim 11, wherein the instructions to recommend changes for the instances of the cells along the paths having timing degradation comprise instructions to recommend changes for the paths based on the assigned weighted priority.

13. A non-transitory computer readable storage medium, the non-transitory computer readable storage medium having stored thereon instructions that, when executed by a processor, cause the processor to:
analyze timing data of an integrated circuit, wherein the timing data includes input and output transition times for cells along paths of the integrated circuit;
identify instances of the cells along the paths of the integrated circuit in which an output transition time is greater than an input transition time;
recommend changes for the instances of the cells along the paths having the output transition time greater than the input transition time, wherein if a length of a path having timing degradation exceeds a first threshold value or a number of inverters or buffers succeeding the path having timing degradation exceeds a second threshold value, split the path into a resistance critical path or a capacitance critical path and assigning a non-default rule to the resistance critical path or the capacitance critical path;
generate at least one file for fabricating an integrated circuit in accordance with the recommended changes; and
fabricate, or cause to be fabricated, an integrated circuit in accordance with the at least one file.

14. The computer readable storage medium of claim 13, wherein the instructions to recommend changes comprise instructions to:
upsize the instances of the cells along the paths to decrease the output transition time to be equal to or less than the input transition time; or
modify a threshold voltage of the instances of the cells along the paths to decrease the output transition time to be equal to or less than the input transition time.

15. The computer readable storage medium of claim 13, wherein the instructions to recommend changes comprise instructions to:
increase a width of a wire trace along the paths of the integrated circuit that cause timing degradation; or
increase spacing between wire traces along the paths of the integrated circuit that cause timing degradation.

16. The computer readable storage medium of claim 13, comprising instructions to:
identify instances of cells along the paths of the integrated circuit in which the cells comprise multi-bit flip-flops; and
debank or unbank the multi-bit flip-flops into individual flip-flops.

17. The computer readable storage medium of claim 13, comprising instructions to:
identify one or more paths of the integrated circuit in which to assign a weighted priority for performance enhancement; and
recommend changes for the paths based on the assigned weighted priority.

18. A method, comprising:
analyzing timing data of an integrated circuit, wherein the timing data includes input and output transition times for cells along paths of the integrated circuit;
identifying instances of the cells along the paths of the integrated circuit in which an output transition time is greater than an input transition time;
recommending changes for the instances of the cells along the paths having the output transition time greater than the input transition time, wherein recommending changes includes debanking or unbanking multi-bit flip-flops into individual flip-flops;
generating at least one file for fabricating an integrated circuit in accordance with the recommended changes; and
fabricating, or causing to be fabricated, an integrated circuit in accordance with the at least one file.

19. The method of claim 18, further comprising:
identifying one or more paths of the integrated circuit in which to assign a weighted priority for performance enhancement; and
recommending changes for the paths based on the assigned weighted priority.

* * * * *